(No Model.)
W. HEARD.
BRICK.
No. 314,022.          Patented Mar. 17, 1885.
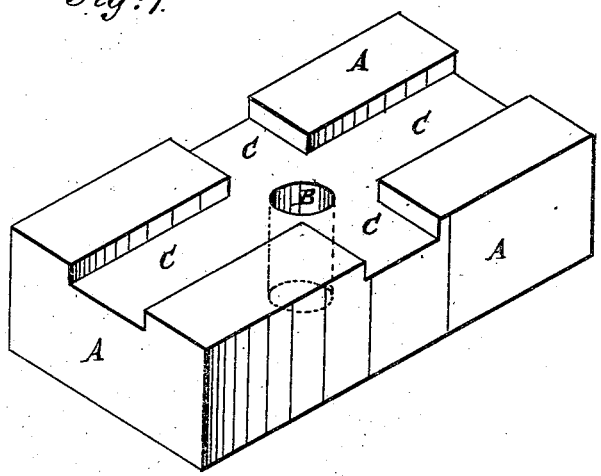
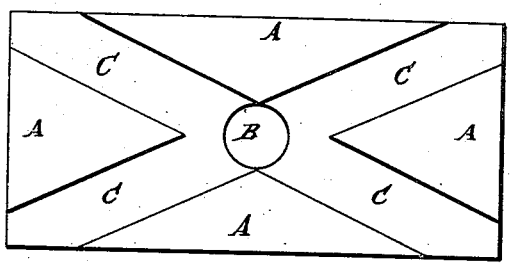
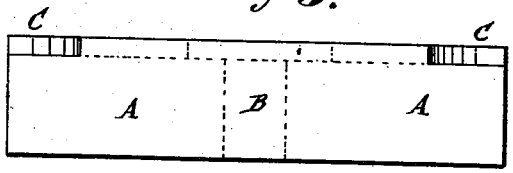
WITNESSES:
INVENTOR:
W. Heard
BY Munn & Co
ATTORNEYS.

UNITED STATES PATENT OFFICE.

WILLIAM HEARD, OF BROOKLYN, NEW YORK.

BRICK.

SPECIFICATION forming part of Letters Patent No. 314,022, dated March 17, 1885.

Application filed August 29, 1884. (No model.)

*To all whom it may concern:*

Be it known that I, WILLIAM HEARD, of Brooklyn, Kings county, and State of New York, have invented a new and useful Improvement in Bricks, of which the following is a full, clear, and exact description.

Reference is to be had to the accompanying drawings, forming a part of this specification, in which similar letters of reference indicate corresponding parts in all the figures.

Figure 1 is a perspective view of one of my improved bricks. Fig. 2 is a plan view of a brick, showing another arrangement of the grooves. Fig. 3 is a side elevation of the brick shown in Fig. 2.

The object of this invention is to provide bricks made in such a manner that they will form a stronger and better wall and can be dried and burned in less time and with less fuel than ordinary bricks.

The invention consists in bricks made with one or more perforations and one or more side grooves, as will be hereinafter fully described.

In making my improved bricks A they are molded with one or more perforations, B, through them from side to side, and with one or more grooves, C, in one or more sides. The perforations B can be in the centers of the bricks A, as shown in Figs. 1 and 2, or through any desired part, and may be in such positions as to open into a groove C. The grooves C can extend across the bricks longitudinally and transversely, as shown in Fig. 1, or diagonally, as shown in Fig. 2, or in any desired direction, and can extend across the bricks from edge to edge, as shown in the drawings, or partly across the said bricks, as may be desired.

With this construction, when the bricks are placed in the kiln to be burned, the perforations B and grooves C allow hot air and the products of combustion to circulate freely between the bricks, so that the said bricks will be burned quicker, more evenly, and with less fuel than ordinary bricks.

With this construction, when the bricks are built into a wall, the mortar will fill the grooves C and project into or fill the perforations B, so that the mortar, when set, will key the bricks together, and thus form a stronger and better wall than ordinary bricks.

These improved bricks can be molded as easily and quickly as ordinary bricks and in the same manner, and will require less material, so that the expense of making the bricks will be lessened.

Having thus described my invention, I claim as new and desire to secure by Letters Patent—

1. An improved brick provided with an aperture, B, and intersecting grooves C, substantially as described.

2. A brick provided with the central aperture, B, and the longitudinal and transverse grooves C on one of its faces, substantially as herein shown and described.

WILLIAM HEARD.

Witnesses:
 JAMES T. GRAHAM,
 C. SEDGWICK.